(12) United States Patent
Varriano-Marston et al.

(10) Patent No.: US 11,565,816 B2
(45) Date of Patent: Jan. 31, 2023

(54) PORTABLE AIRLINE INTER-PASSENGER SHIELD

(71) Applicant: Windham Packaging, LLC, Windham, NH (US)

(72) Inventors: Elizabeth Varriano-Marston, Windham, NH (US); Casey B. LaCourse, Sutton, VT (US)

(73) Assignee: Windham Packaging, LLC, Windham, NH (US)

( * ) Notice: Subject to any disclaimer, the term of this patent is extended or adjusted under 35 U.S.C. 154(b) by 111 days.

(21) Appl. No.: 17/213,618

(22) Filed: Mar. 26, 2021

(65) Prior Publication Data
US 2022/0048628 A1 Feb. 17, 2022

Related U.S. Application Data

(60) Provisional application No. 63/066,525, filed on Aug. 17, 2020.

(51) Int. Cl.
*B64D 11/06* (2006.01)
(52) U.S. Cl.
CPC .................. *B64D 11/0606* (2014.12)
(58) Field of Classification Search
CPC .................................. B64D 11/0606
USPC ............................ 160/24, 272, 31; 296/24.46
See application file for complete search history.

(56) References Cited

U.S. PATENT DOCUMENTS

| | | | | |
|---|---|---|---|---|
| 1,627,906 A | * | 5/1927 | Jones ...................... | G03B 21/58 160/24 |
| 1,981,444 A | * | 11/1934 | Wittel .................... | G03B 21/58 160/24 |
| 3,891,263 A | * | 6/1975 | Orsulak ................... | B60R 5/047 280/727 |
| 4,825,921 A | | 5/1989 | Rigter | |
| 5,653,278 A | * | 8/1997 | Cheng ...................... | E06B 9/56 160/310 |
| 5,671,924 A | * | 9/1997 | Scott ......................... | F41J 1/10 273/395 |

(Continued)

FOREIGN PATENT DOCUMENTS

WO 2016167820 A1 10/2016

OTHER PUBLICATIONS

International Search Report and Written Opinion for PCT Application No. PCT/US2021/024307 dated Jul. 1, 2021, 10 pages.

*Primary Examiner* — Christopher D Hutchens
(74) *Attorney, Agent, or Firm* — Maine Cernota & Rardin

(57) ABSTRACT

An apparatus for inhibiting cross contamination by airborne droplets between adjacent passengers on an aircraft comprises a case in which a flexible shield can be stored, and from which the shield can be deployed in a vertical, substantially flat configuration, where it is maintained by an extension mechanism. The shield can be coiled within the case when not deployed, and can be retractable by a ratchet and spring when deployment is terminated. An attachment mechanism positions the case between the passengers by fixing the case to a structure such as an arm rest. The extension mechanism can include one or more rigid or semi-rigid rods. The case or shield can include a storage cavity for storage of the rods when not deployed. The attachment mechanism can include an arm rest clamp and/or an insertion member that can pivot downward for insertion between a seat cushion and adjacent structure.

13 Claims, 15 Drawing Sheets

(56) References Cited

U.S. PATENT DOCUMENTS

| | | | | |
|---|---|---|---|---|
| 5,702,143 | A * | 12/1997 | Shimazaki | B60R 21/06 |
| | | | | 296/37.16 |
| 6,052,227 | A * | 4/2000 | Niwa | G03B 21/58 |
| | | | | 359/461 |
| 6,115,951 | A * | 9/2000 | Jing | E01F 9/688 |
| | | | | 116/63 P |
| 6,260,903 | B1 | 7/2001 | Von Der Hyde | |
| 7,048,319 | B2 * | 5/2006 | Ament | B60R 5/047 |
| | | | | 296/37.16 |
| 8,944,132 | B1 * | 2/2015 | Floyd | E06B 9/42 |
| | | | | 160/370.22 |
| 2006/0001302 | A1 * | 1/2006 | Achilles | B64D 11/0606 |
| | | | | 297/284.1 |
| 2011/0032612 | A1 | 2/2011 | Abe et al. | |
| 2014/0252821 | A1 | 9/2014 | Friedlander | |
| 2020/0385124 | A1 * | 12/2020 | Zhang | F16H 21/44 |
| 2021/0221516 | A1 * | 7/2021 | Bonnefoy | B64D 11/0641 |
| 2021/0371110 | A1 * | 12/2021 | Penley | B64D 11/0647 |
| 2021/0387729 | A1 * | 12/2021 | Subramanian | B64D 11/0606 |
| 2022/0274709 | A1 * | 9/2022 | Bonnefoy | B64D 11/0023 |

\* cited by examiner

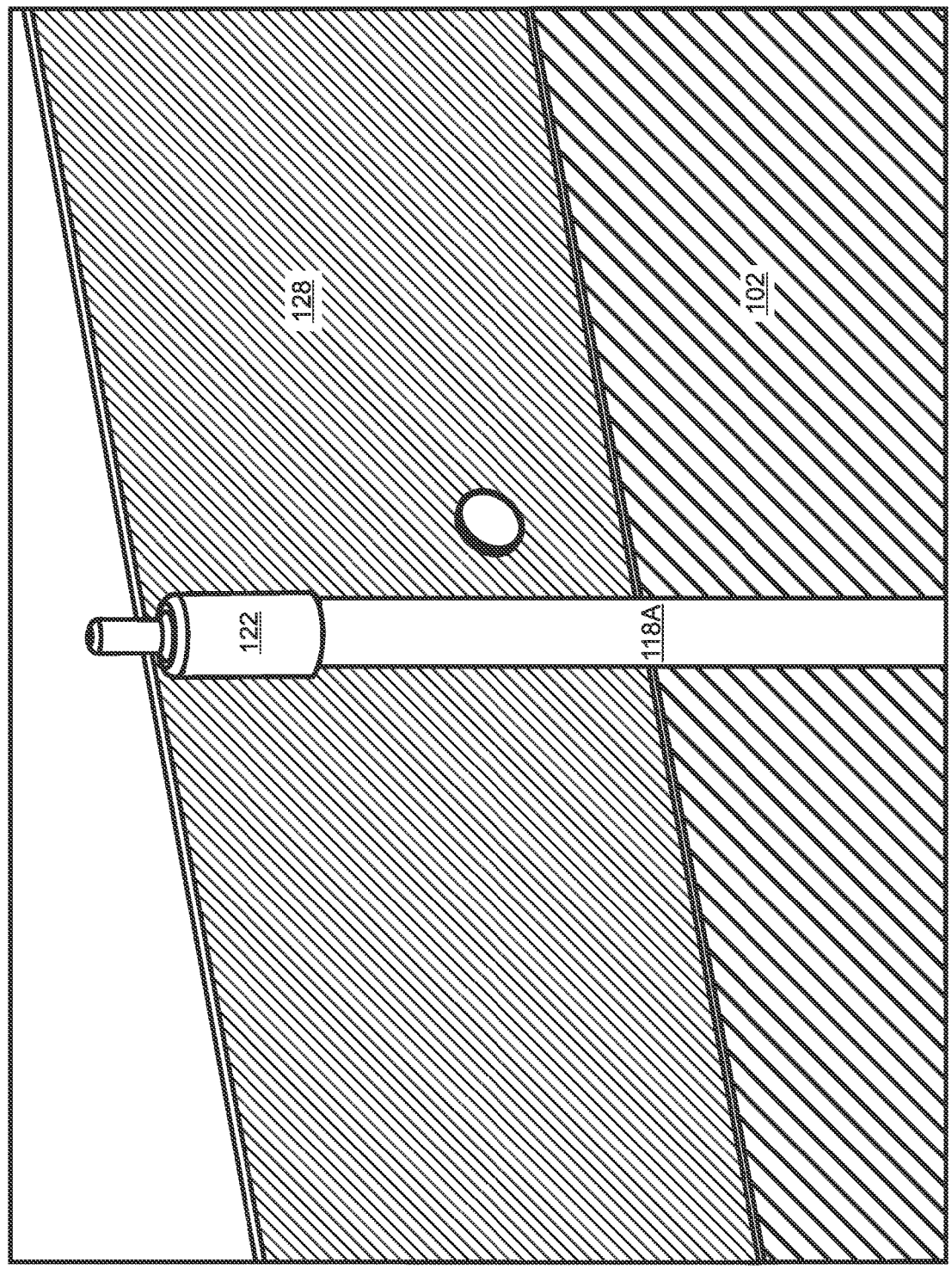

PORTABLE AIRLINE INTER-PASSENGER SHIELD

RELATED APPLICATIONS

This application claims the benefit of U.S. Provisional Application No. 63/066,525, filed Aug. 17, 2020, which is herein incorporated by reference in its entirety for all purposes.

FIELD OF THE INVENTION

The invention relates to personal protective apparatus that minimizes cross contamination of pathogens between individuals, and more particularly, to barriers that inhibit the flow of airborne particles between proximate individuals.

BACKGROUND OF THE INVENTION

The COVID-19 pandemic, caused by the SARS-CoV-2 virus, has given rise to many new challenges. Furthermore, the emergence of SARS-CoV-2 has greatly heightened public awareness of the risks that are associated with highly transmissible infectious diseases, and of the possibility that another, more virulent strain could one day appear. In particular, it is generally understood that the primary vector for spread of the pandemic, and indeed for many respiratory diseases, is via airborne droplets that are transmitted between proximate individuals, for example if an infected individual coughs or sneezes near an uninfected individual. This threat is heightened by the fact that infectious individuals may not initially have any symptoms of the disease, and indeed may never develop symptoms, but may nevertheless function as a "carrier" of the disease.

One approach is to "social distance," whereby everyone within a population attempts to remain separated from all other individuals by a specified distance, such as six feet or two meters. However, physical separation is not always possible, and by itself physical separation may not be sufficient to prevent the spread of infection.

Another approach is for everyone within a population to wear a face mask. Some masks, such as so-called "N95" masks, are known to be highly effective in protecting both the wearer and other nearby persons from cross contamination. However, such masks are in very high demand, and may not be available to the general public. Furthermore, some individuals may be unwilling to wear N95 and other highly protective masks for long periods of time, because such masks may be uncomfortable to wear, may inhibit or seem to inhibit the breathing of the wearer, may inhibit the ability of the wearer to be heard and understood by others, and may trap moisture and cause irritation to the face of the wearer. On the other hand, simpler masks and scarves that are widely available and more comfortable to wear can provide only limited protection. In particular, simple masks and scarves are mainly effective in protecting others who are proximal to the wearer, while providing only limited protection to the wearer.

Yet another approach is to place a physical barrier between individuals, such as a layer of plexiglass. This can be an effective approach, for example, when implemented in a fixed location, for example in a store or bank, to separate point-of-sale employees from customers. However, such implementations are generally not portable, and are not always practical.

One circumstance where it is especially challenging to prevent cross-contamination is between airline passengers in adjoining seats, especially when most of the seats on an airliner are occupied. Airline seats are typically small and closely packed, and cannot be easily moved or removed. Furthermore, the very compact space within an airliner renders it nearly impossible to install permanent shields between the seats, because any such installation would render the seats inaccessible to many passengers. And even if such an approach were possible, many airlines would be unwilling to bear the cost of such an implementation, under the assumption that any such modification would need to be reversed once the pandemic was ended. Unfortunately, the wearing of masks on an airliner may not provide sufficient protection to someone who is seated next to an infected passenger.

In general, the danger of cross-contamination on airliners is not limited to times of pandemic. Many individuals, especially those who have compromised immune systems or other reasons for a heightened concern regarding cross contamination, may be reluctant to fly on airliners even during "normal" times, due to concerns about the contagion of seasonal flus and other airborne pathogens.

What is needed, therefore, is an apparatus and method that can be implemented by an airline passenger for reducing the risk of cross-contamination by neighboring passengers.

SUMMARY OF THE INVENTION

The present invention is an apparatus and method that can be implemented by an airline passenger for reducing the risk of cross-contamination by neighboring passengers. Specifically, the present invention is a compact and portable device containing a flexible shield that can be deployed by a user seated in an aircraft to intercept airborne droplets emitted by a neighboring passenger located next to the user.

The invention is an apparatus that includes a case and a flexible shield that can be stored within the case. The apparatus further includes one or more attachment mechanisms that are able to fix the case in a position proximal to a passenger who is seated in an airline seat. In embodiments, the attachment mechanism is configured to fix the case above and proximal to an arm rest that is provided between the passenger's seat and an adjacent seat. Attachment can be, for example, by clamping of the case to the arm rest, or by extension of one or more attachment arms downward from the case between adjacent seat cushions or between a seat cushion and a wall that is supporting the arm rest. In some of these embodiments, the attachment arm or arms can be pivoted so as to align with the case when not in use.

In embodiments, the flexible shield can be extended upward from the case through a slot provided in a top of the case. In some embodiments, the shield can be coiled within the case when not deployed, and in some of these embodiments the apparatus further includes a spring and ratchet mechanism configured to maintain the shield in an extended state while in use, and to withdraw and coil the shield within the case when usage thereof has ended.

Embodiments include an extension mechanism configured to maintain the shield in a substantially flat, extended configuration while in use, thereby forming a barrier between the passenger and a neighboring passenger. In various embodiments, the extension mechanism can include one or more rigid or semi-rigid rods. At least one of the rods can be insertable into one or more sleeves provided in the flexible shield. In some embodiments, a single rod can be inserted in one or more central sleeves provided in the flexible shield, and can engage with fittings provided on the case and at the top of the flexible shield. In other embodiments, sleeves extend upward along both sides of the shield and across the top, and three rods are provided for insertion within the sleeves and attachment to each other, thereby supporting the shield. A storage cavity can be provided on the case or at the end of the shield for storage of the rod or rods when not in use.

Method of use embodiments of the present invention include carrying by a passenger of the disclosed apparatus onto an aircraft, for example within the passenger's carry-on luggage. Once seated in an airline seat, the passenger attaches the apparatus in a location between the passenger and an adjacent passenger, deploys the flexible shield from the case, and engages the extension mechanism so as to maintain the flexible shield in a vertical and substantially flat configuration between the passenger and the adjacent passenger, so that the flexible shield functions as a barrier to any exchange of airborne droplets between the passenger and the adjacent passenger. In embodiments where the passenger is seated in a non-window seat, the passenger can bring two of the disclosed apparatuses onto the plane, so that a shield can be deployed on each side of the passenger.

One general aspect of the present invention is an apparatus for reducing a risk of cross-contamination between adjacent first and second passengers while traveling on an aircraft. The apparatus includes a flexible shield, a case configured for containing the flexible shield when the flexible shield is not deployed, the flexible shield being extendable from the case, an attachment mechanism configured to attach the case to a structural member of the aircraft, such that the case is located beside the first passenger and between the first and second passengers, and an extension mechanism configured to maintain the flexible shield in a substantially flat, vertical configuration when the flexible shield is extended upward from the case, thereby providing a barrier between the first and second passengers that inhibits cross contamination between the first and second passengers by airborne droplets.

In embodiments, the flexible shield is configured to be coiled within the case when the flexible shield is not deployed. Some of these embodiments further include a spring configured to withdraw the flexible shield into the case when deployment of the flexible shield is terminated. And some of these embodiments further include a ratchet mechanism configured to maintain the shield exterior to the case while the shield is in use, and to release the shield for retraction by the spring into the case when use of the shield has ended.

In any of the above embodiments, the attachment mechanism can include an insertion member configured for insertion between a seat cushion upon which the first passenger is seated and an adjacent structure. In some of these embodiments the insertion member comprises an attachment arm configured to extend downward from the case. And in some of these embodiments the attachment arm is configured to pivot into alignment with the case when the apparatus is not attached to the structural member of the aircraft.

In any of the above embodiments, the flexible shield can include a sleeve, and the extension mechanism can include a rigid or semi-rigid rod that can be inserted into the sleeve. In some of these embodiments, the apparatus further comprises a storage cavity within which the rigid or semi-rigid rod can be stored when not deployed. In some of these embodiments, the storage cavity is provided on an exterior surface of the case, or at an upper end of the shield.

Another general aspect of the present invention is a method of reducing a risk of cross-contamination between first and second passengers seated in adjacent seats of an aircraft. The method includes providing an apparatus according to any of the embodiments of the first general aspect, transporting by the first passenger of the apparatus into the aircraft, upon being seated in the aircraft adjacent to the second passenger, attachment of the apparatus by the first passenger to a structural member of the aircraft by means of the attachment mechanism, such that the case is located beside the first passenger and between the first and second passengers, extension by the first passenger of the flexible shield from the case vertically upward, and deployment by the first passenger of the extension mechanism, thereby maintaining the flexible shield in a substantially flat, vertical configuration, such that the flexible shield functions as a barrier between the first and second passengers that inhibits cross contamination between the first and second passengers by airborne droplets.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 1D is a close-up view of an upper portion of the embodiment of FIG. 1C;

DETAILED DESCRIPTION

The present invention is an apparatus and method that can be implemented by an airline passenger for reducing a risk of cross-contamination by neighboring passengers. Specifically, the present invention is a compact and portable device containing a flexible shield that can be deployed by a user seated in an aircraft seat to intercept airborne droplets emitted by a neighboring passenger located next to the user.

Figure 1A:
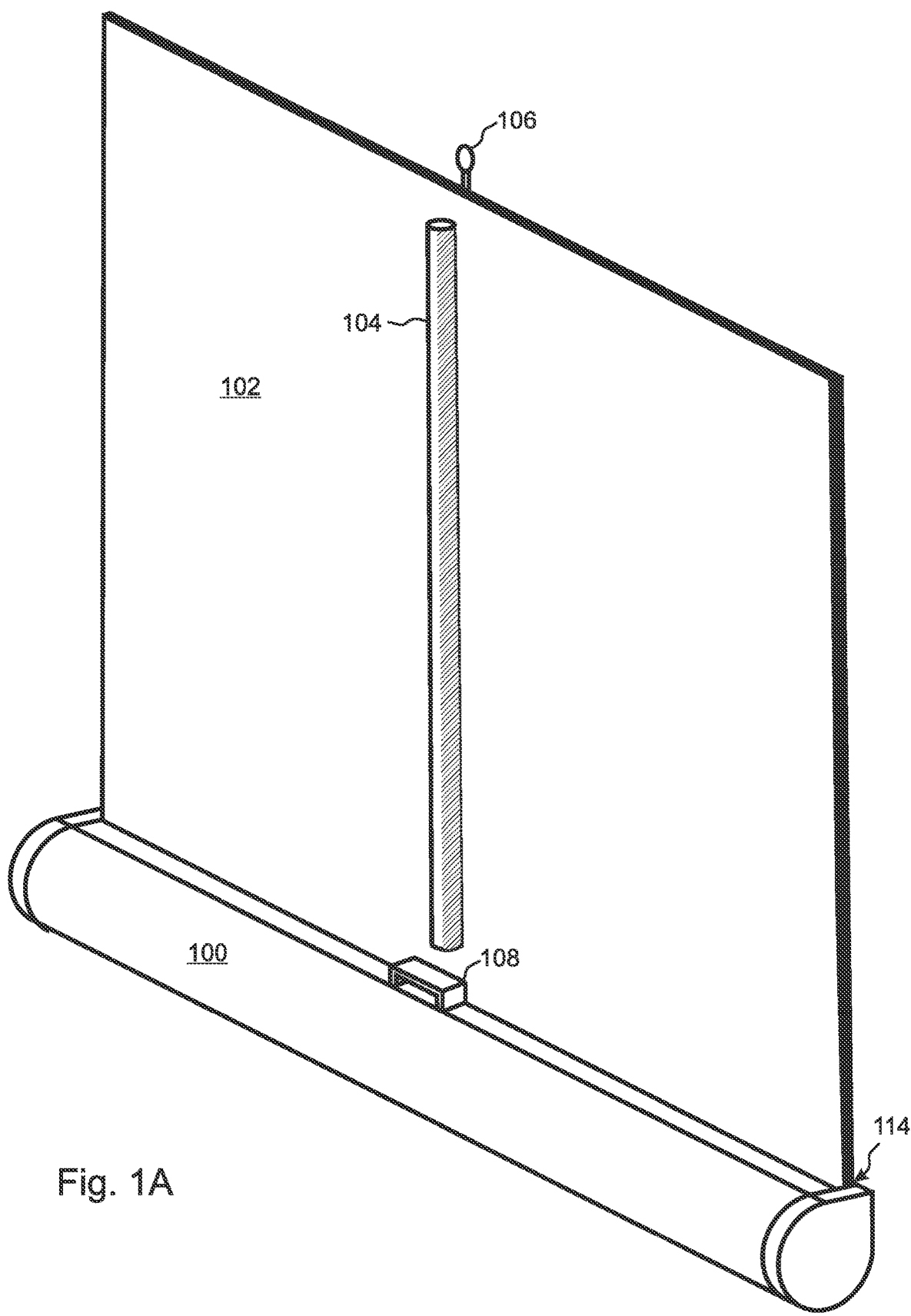
FIG. 1A is a perspective front view of an embodiment of the present invention wherein the extension mechanism includes a single sleeve for a single rod.
Figure 1B:
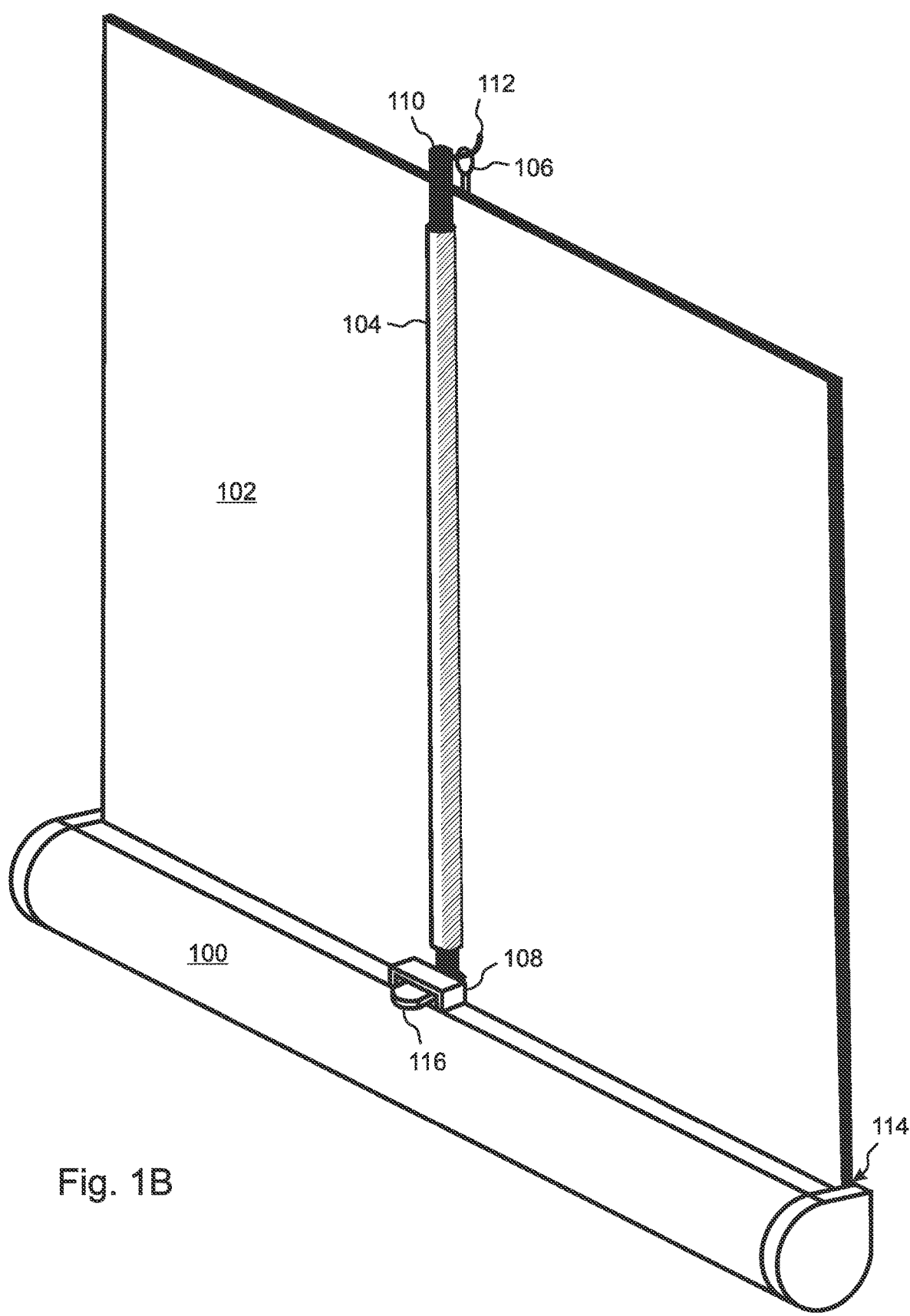
FIG. 1B is a perspective front view of the embodiment of FIG. 1A showing the rod deployed to maintain the shield in an extended configuration.

With reference to FIGS. 1A and 1B, the invention is an apparatus that includes a case 100 and a flexible shield 102 that can be stored within the case 100. In embodiments, the flexible shield 102 can be extended upward from the case 100 through a slot 114 provided in a top of the case 100.

Embodiments include an extension mechanism configured to maintain the shield 102 in a substantially flat, extended configuration while in use, thereby forming a barrier between the passenger and a neighboring passenger. In the embodiment of FIGS. 1A and 1B, the extension mechanism includes a single rod 110 that can be inserted into a central sleeve 104 provided in the flexible shield 102. Attached to the rod 110 are a lower structure 116 that can engage with a lower fitting 108 provided on the case 100, and an upper structure 112 that can engage with an upper fitting 106 at the top of the flexible shield 102.

Figure 1C:
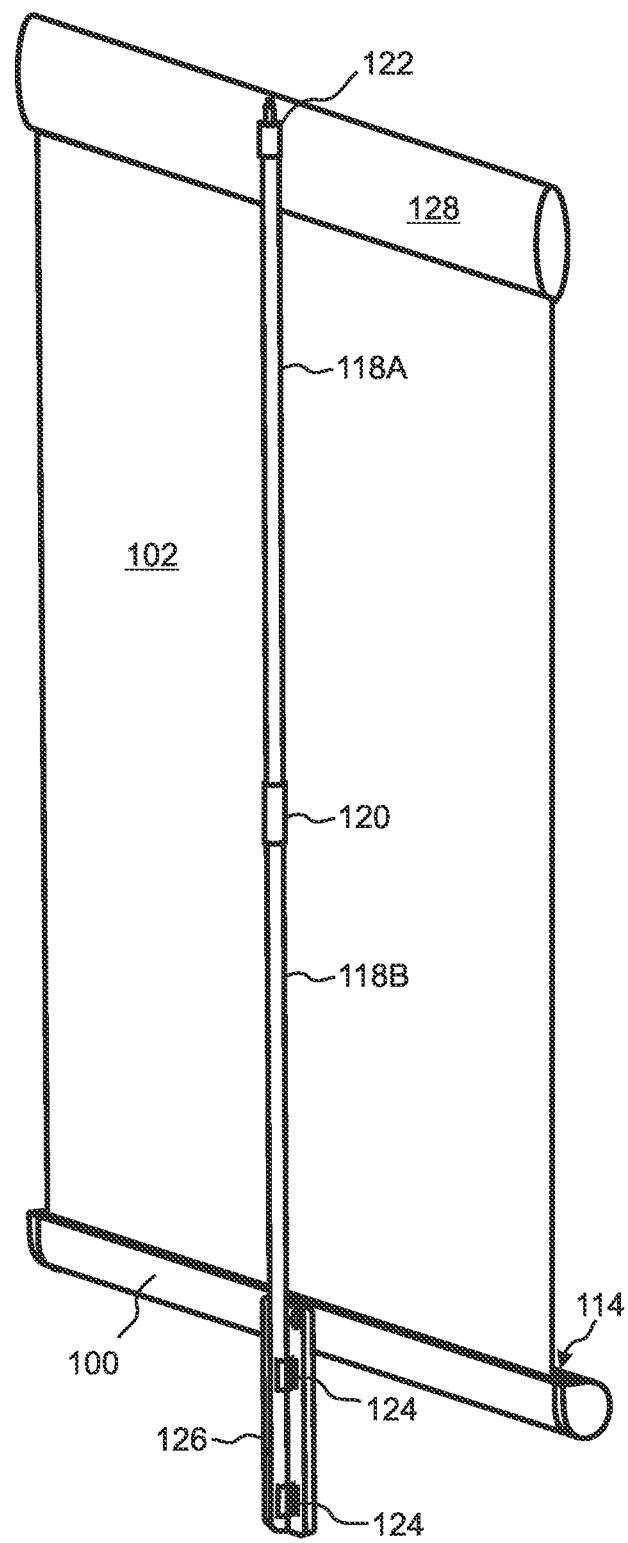
FIG. 1C is a perspective rear view of an embodiment of the present invention wherein the extension mechanism includes a pair of rods joined end-to-end.
Figure 1E:
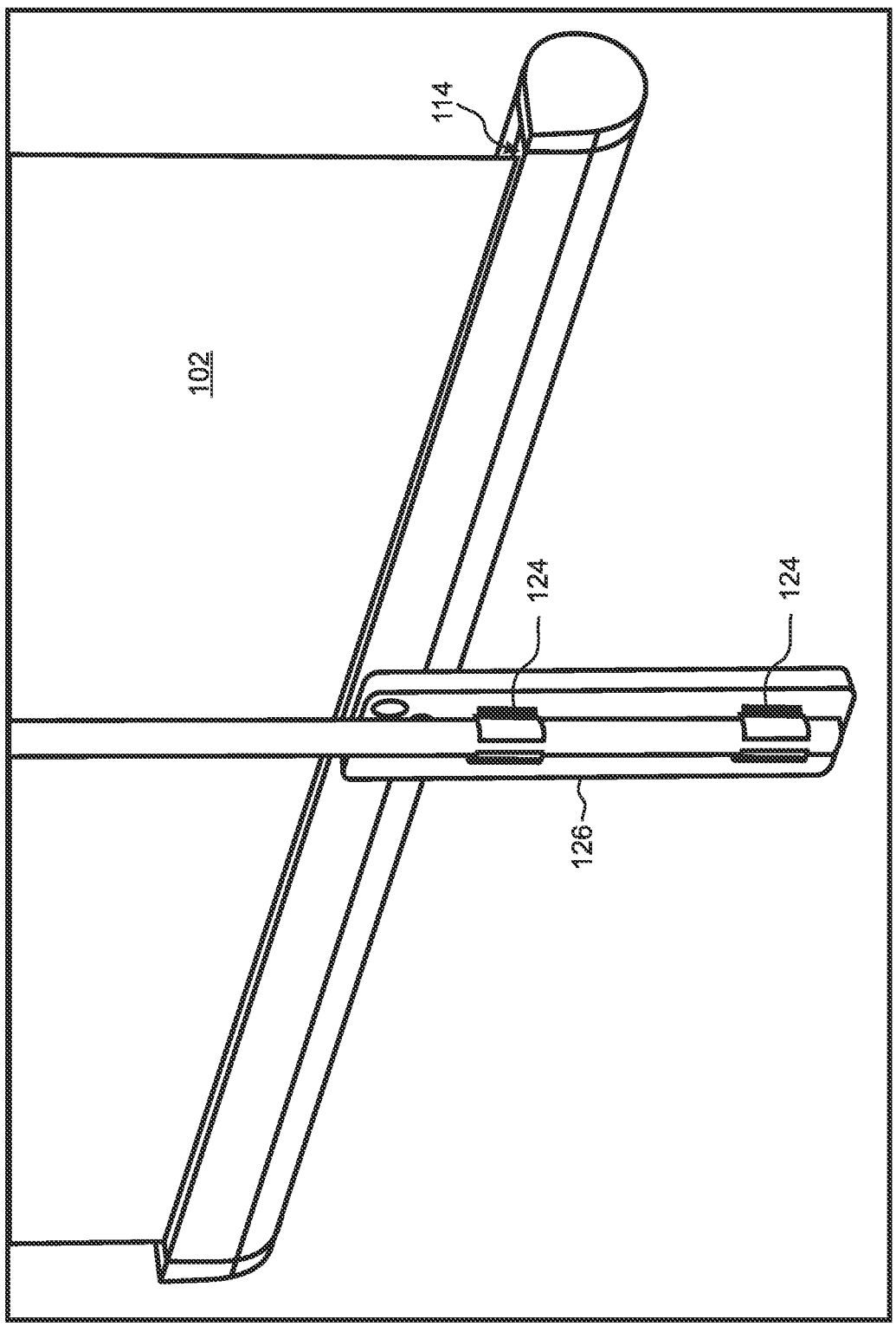
FIG. 1E is a close-up view of a lower portion of the embodiment of FIG. 1C.

In the embodiment of FIGS. 1C through 1E, the extension mechanism includes a pair of rods 118A, 118B joined lengthwise by an attachment sleeve 120. The top of the upper rod 118A is inserted into a fitting 122 that is provided at the top of the shield 102, while the bottom of the lower rod 118B is held by a pair of clips 124 that are provided on an attachment arm 126 that is pivotably attached to the case 100. The embodiment of FIGS. 1C-1E also includes a carrier pouch 128 at the top of the shield 100 in which the rods 118A, 118B and attachment sleeve 120 can be stored when the shield is not in use. FIG. 1D is an expanded view of the upper portion of FIG. 1C, while FIG. 1E is an expanded view of the lower portion of FIG. 1C.

Figure 2A:
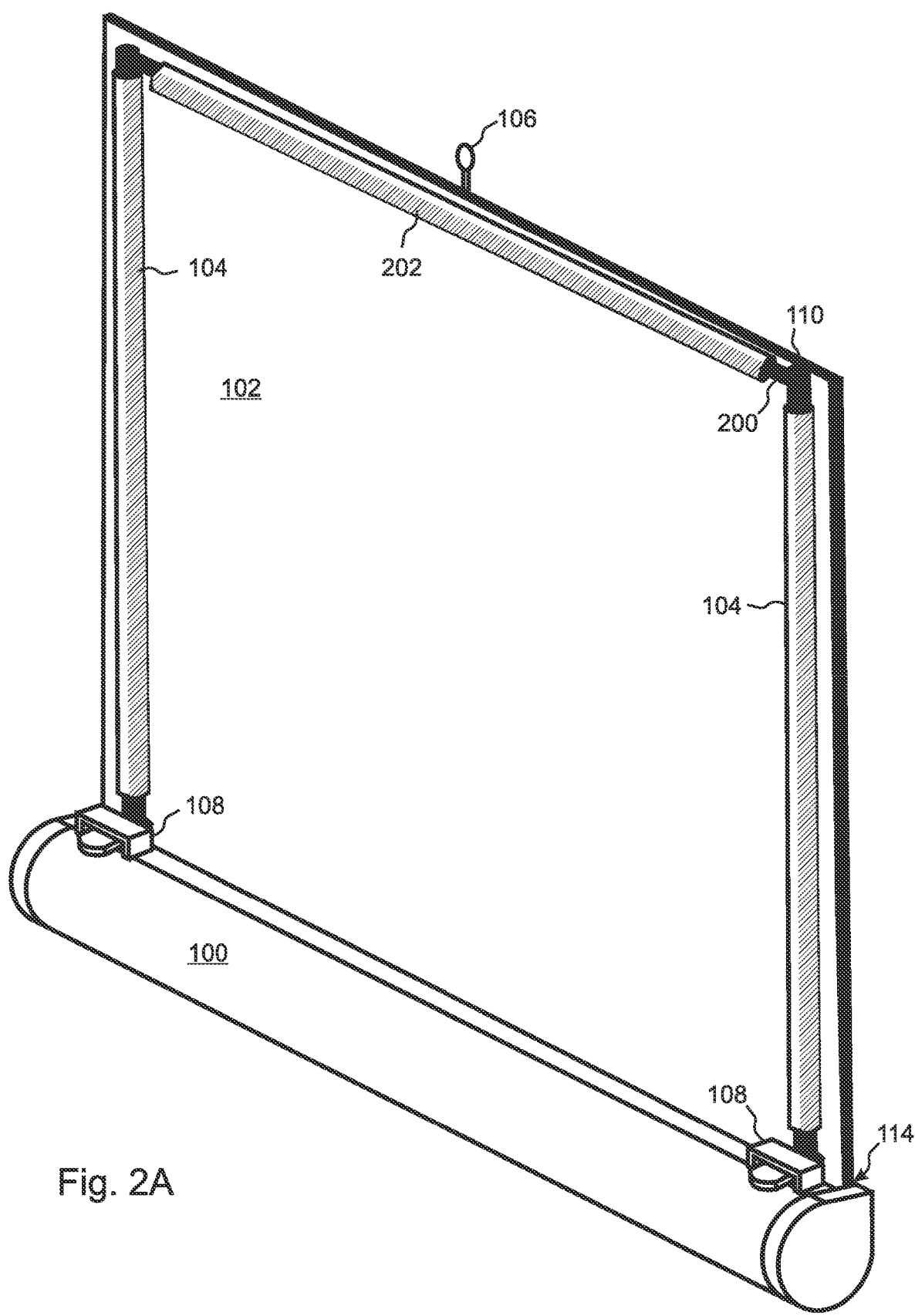
FIG. 2A is a perspective front view of an embodiment of the present invention wherein the extension mechanism includes a pair of vertical rods and a horizontal rod.
Figure 2B:
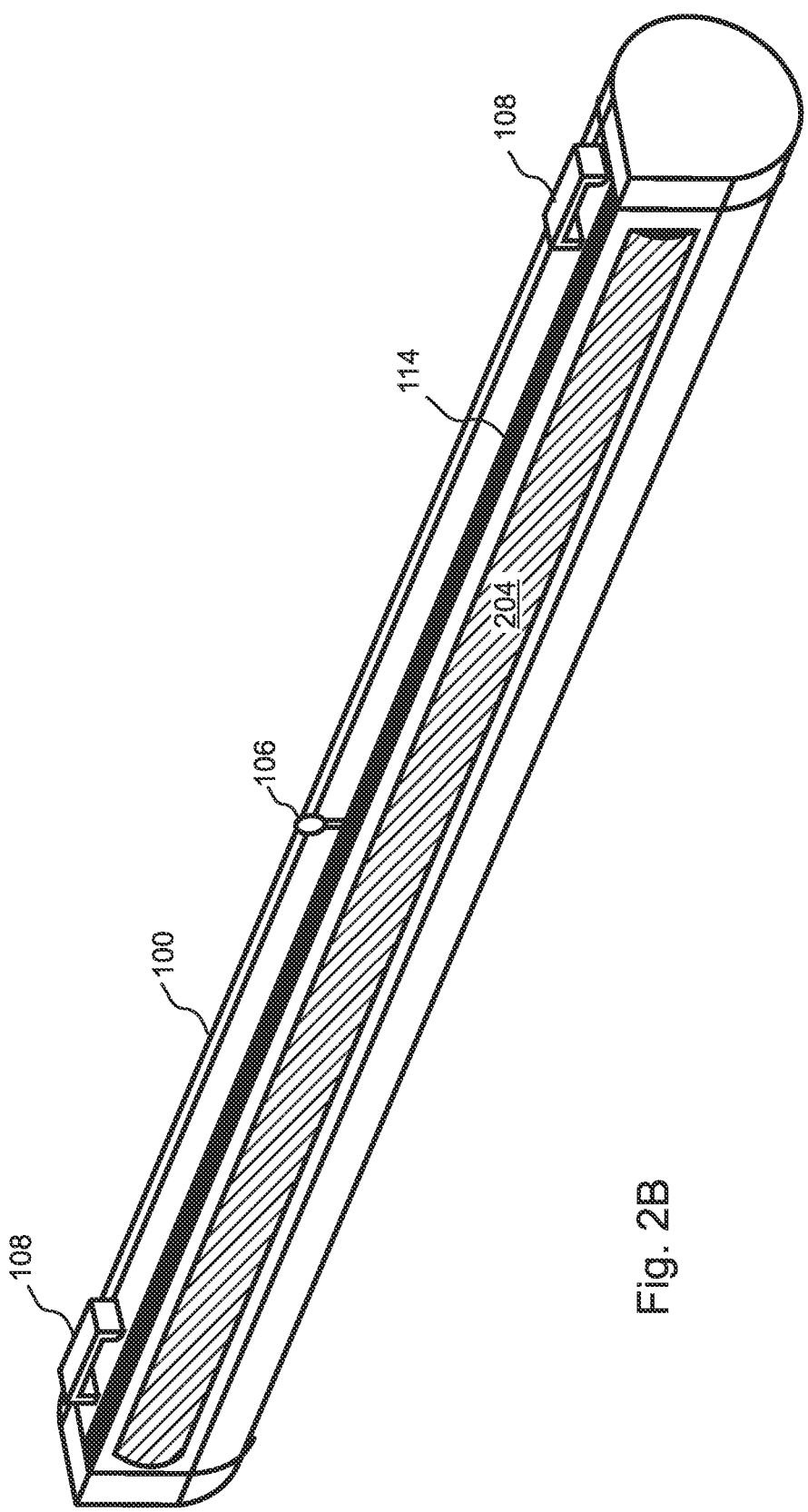
FIG. 2B is a perspective rear view of the embodiment of FIG. 2A showing a storage cavity configured for storing the rods of the extension mechanism.

In the embodiment of FIG. 2A, a pair of vertical rods 110 are inserted into sleeves 104 that extend upward along each side of the flexible shield 102 and engage with a horizontal rod 200 that is inserted into a horizontal sleeve 202 that is provided across the top of the flexible shield 102, thereby supporting the shield. Similar embodiments provide other extension mechanisms, such as the single vertical rod 110 of FIG. 1B combined with the horizontal rod 200 of FIG. 2A. A storage cavity 204, as shown in the rear view of FIG. 2B can be provided on the case 100 for storing the rod or rods 110, 200 when not in use.

Figure 3A:
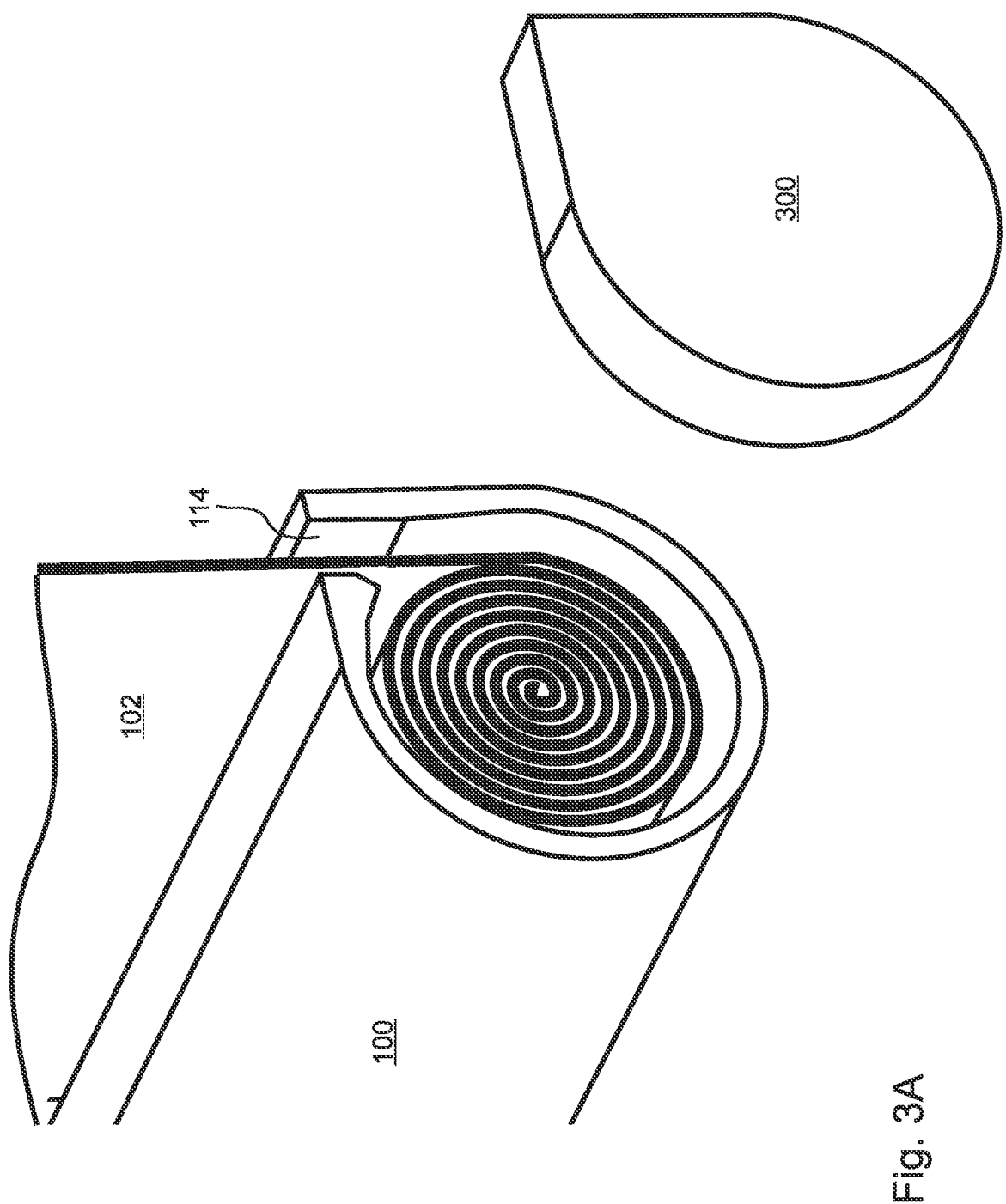
FIG. 3A is a close-up perspective end view of an end of a case in an embodiment with an end cap and ratchet mechanism removed, showing the flexible shield coiled within the case.
Figure 3B:
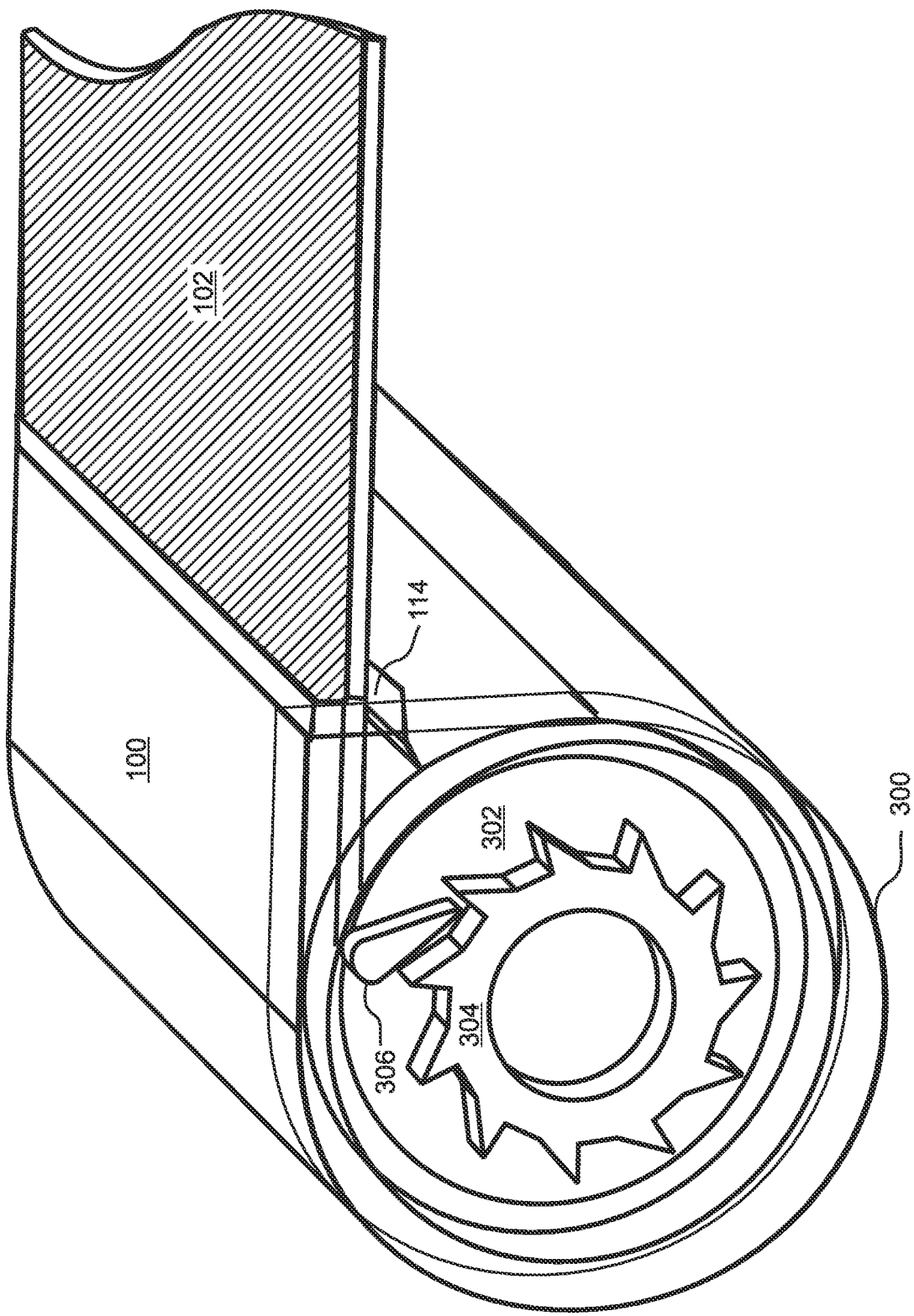
FIG. 3B is a close-up perspective end view of the embodiment of FIG. 3A, wherein the end cap has been rendered as transparent so that the underlying ratchet mechanism is visible.

As can be seen in FIG. 3A, which is a close-up of a case 100 with an end cap 300 removed, in some embodiments the flexible shield 102 can be coiled within the case 100 when not deployed. With reference to FIG. 3B, in some of these embodiments the apparatus further includes a ratchet and spring mechanism 302 configured to withdraw and coil the shield 102 within the case 100 when usage thereof has ended. In FIG. 3B, the end cap 300 has been rendered as transparent, so that the cog 304 and ratchet pin 306 are visible.

Figure 4A:
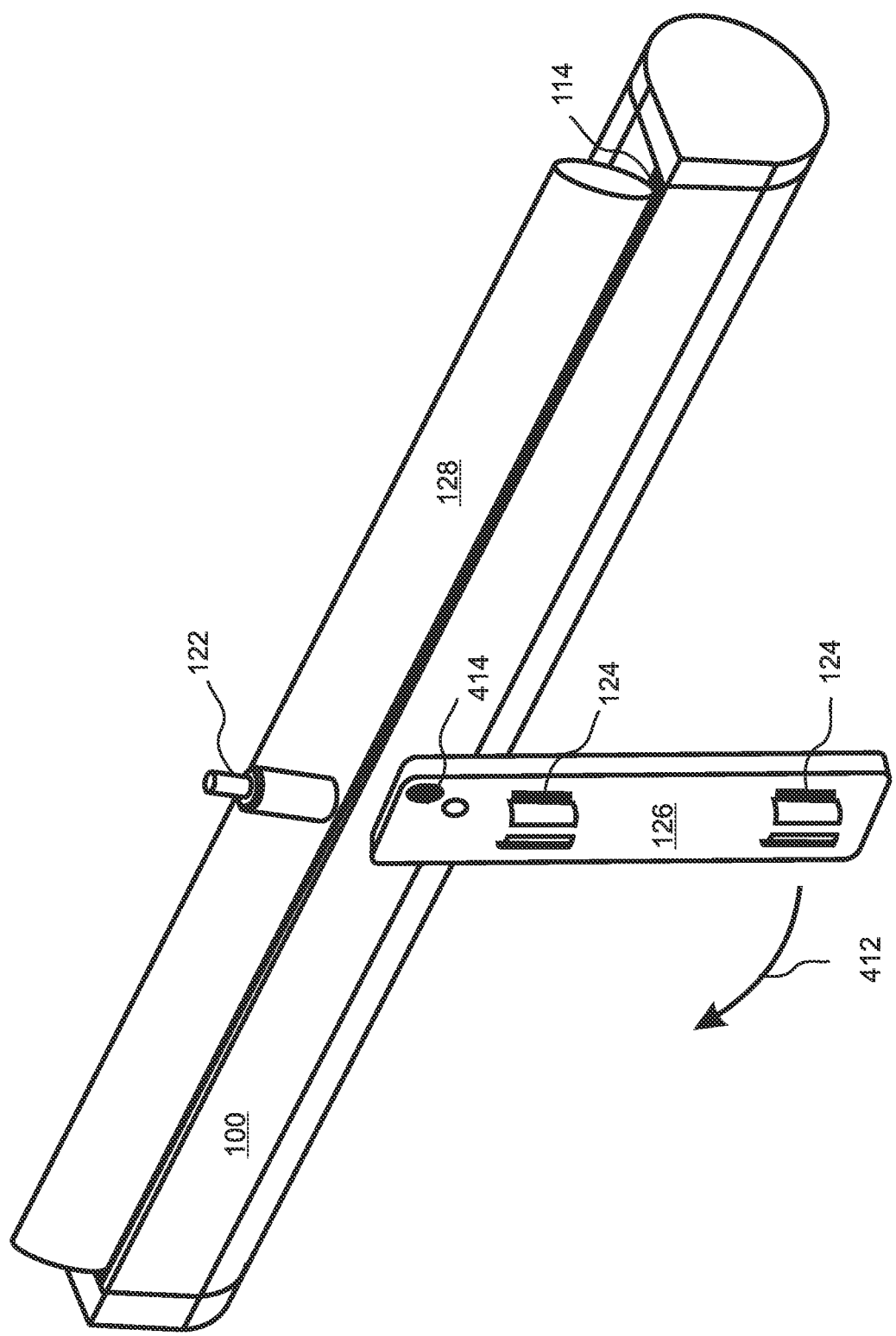
FIG. 4A is a perspective rear view of the embodiment of FIG. 1C, shown with the shield retracted and the attachment arm deployed and configured for insertion between seat cushions or between a seat cushion and adjacent panel.
Figure 4B:
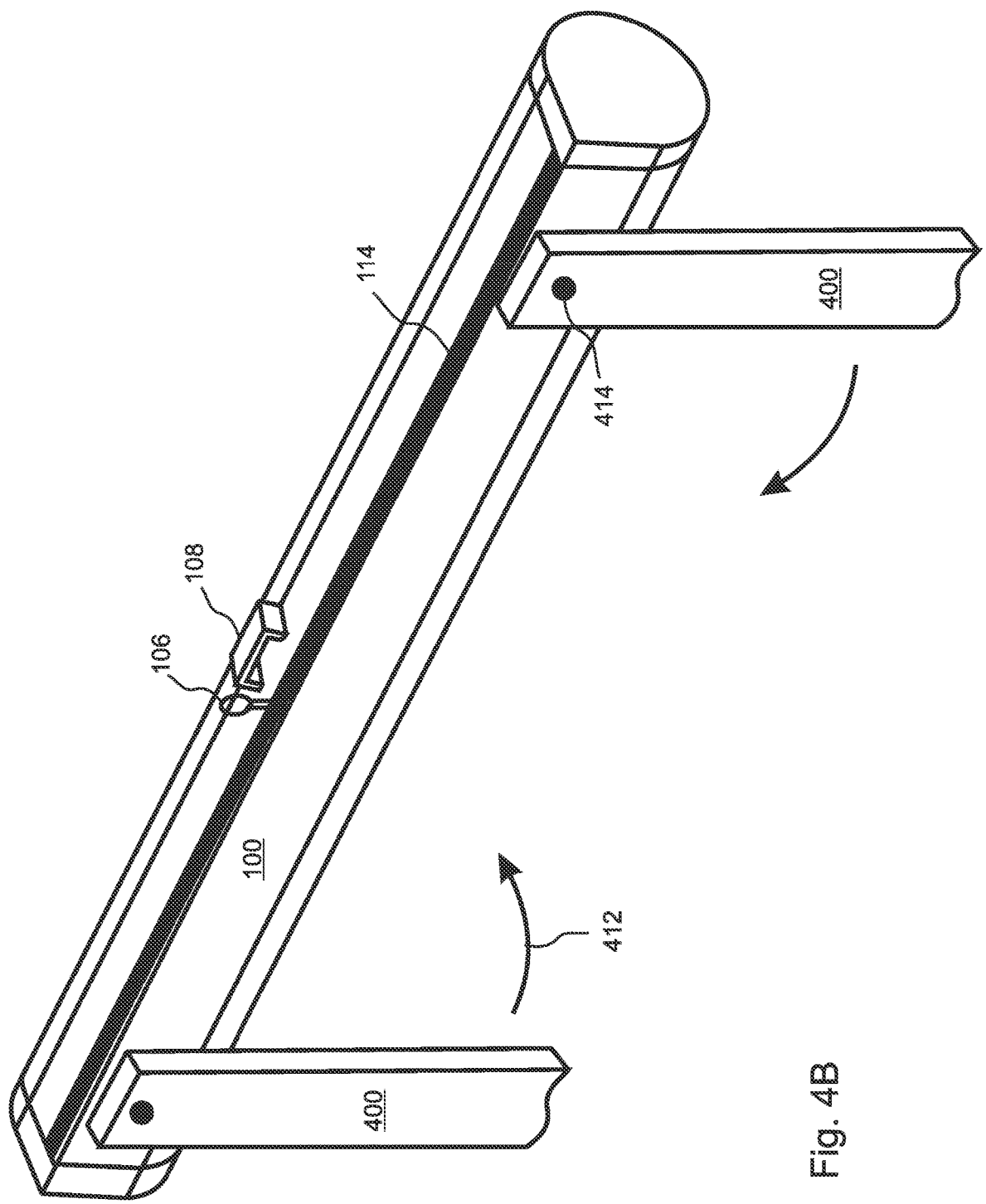
FIG. 4B is a perspective rear view of an embodiment wherein the attachment mechanism is a pair of pivoting attachment arms configured for insertion between seat cushions or between a seat cushion and adjacent panel.
Figure 4C:
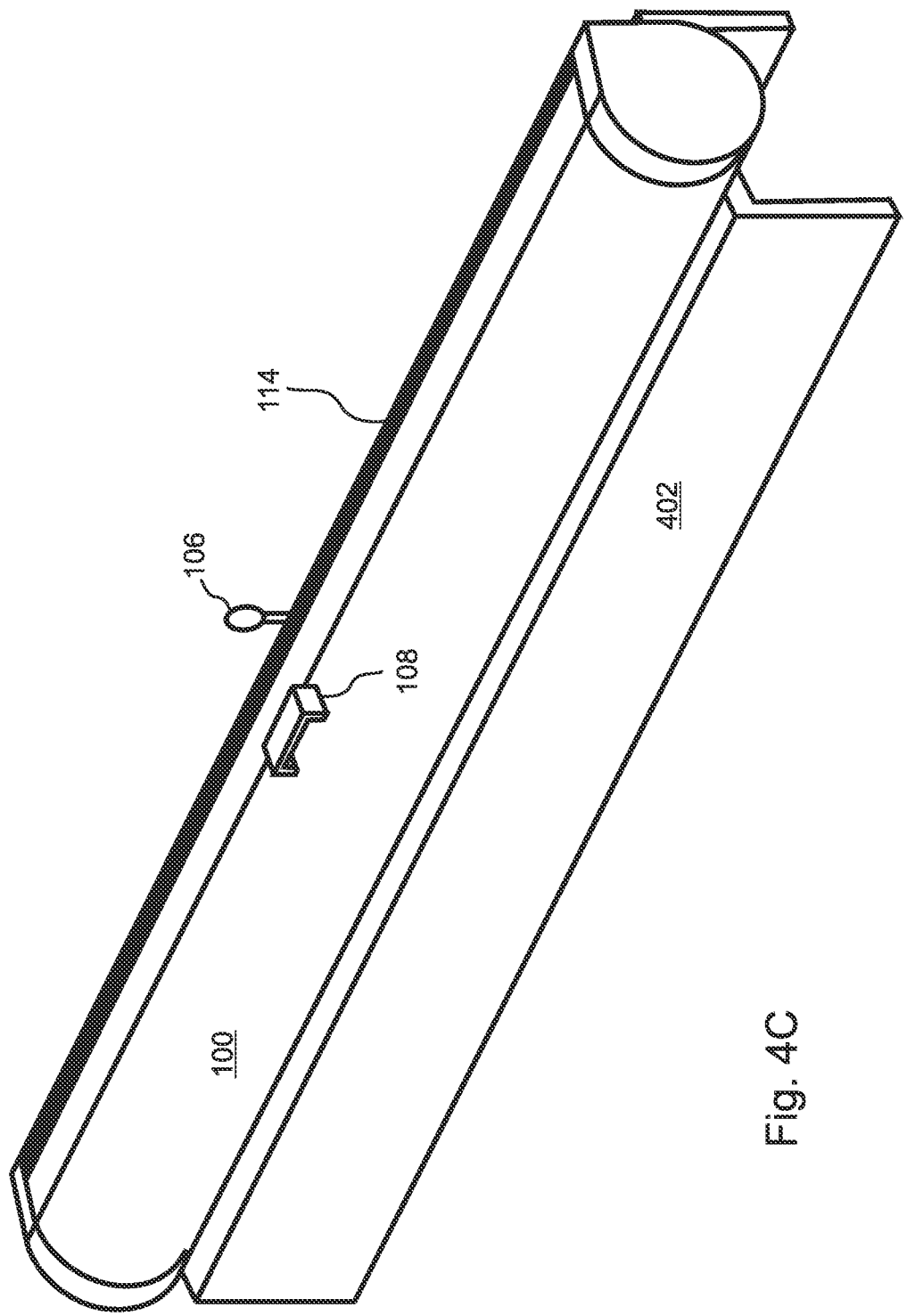
FIG. 4C is a front perspective view of an embodiment wherein the attachment mechanism is a bracket configured for attachment to an arm rest.
Figure 4D:
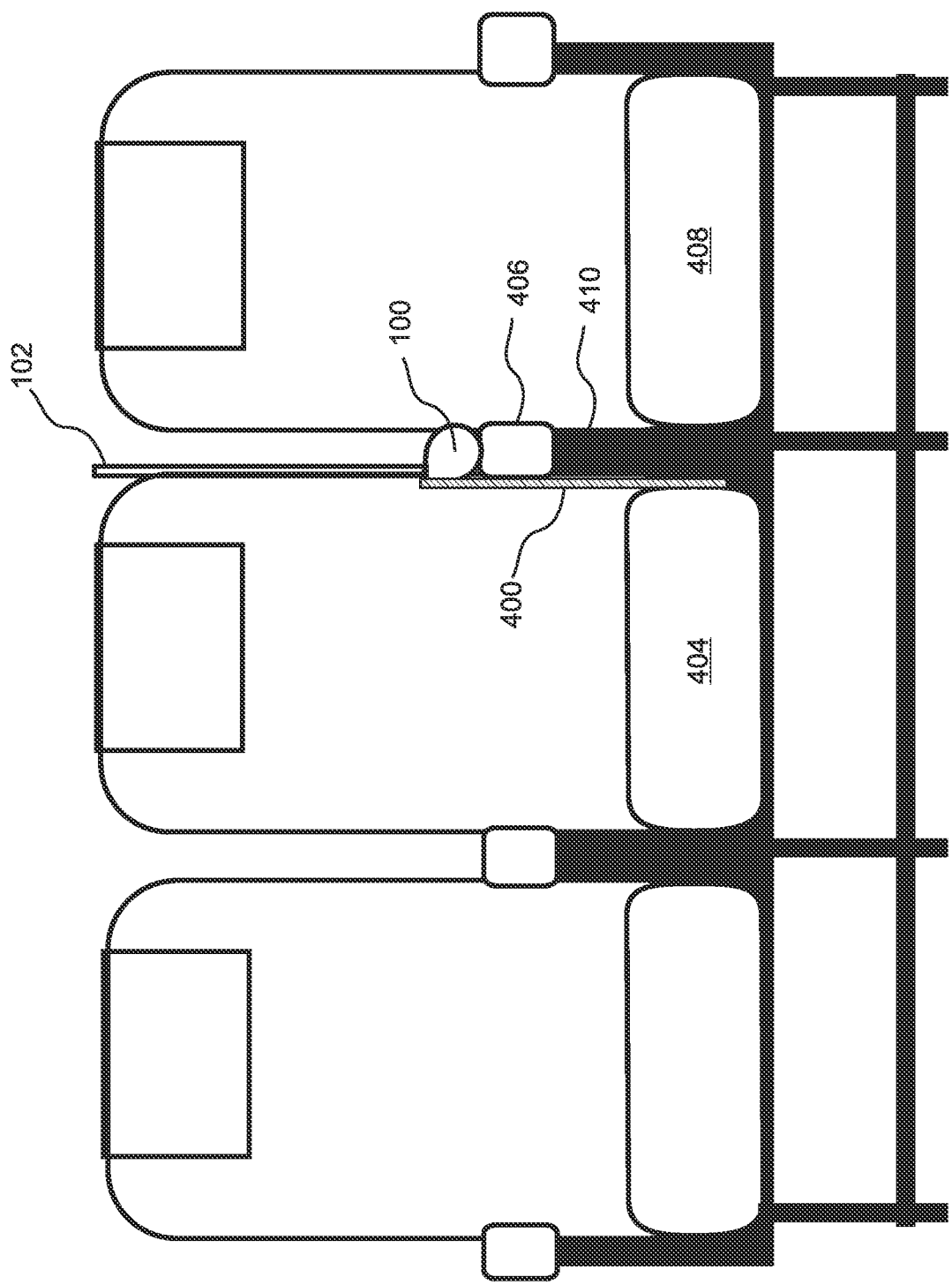
FIG. 4D is a front view of a row of airline seats showing the embodiment of FIG. 4A deployed.
Figure 4E:
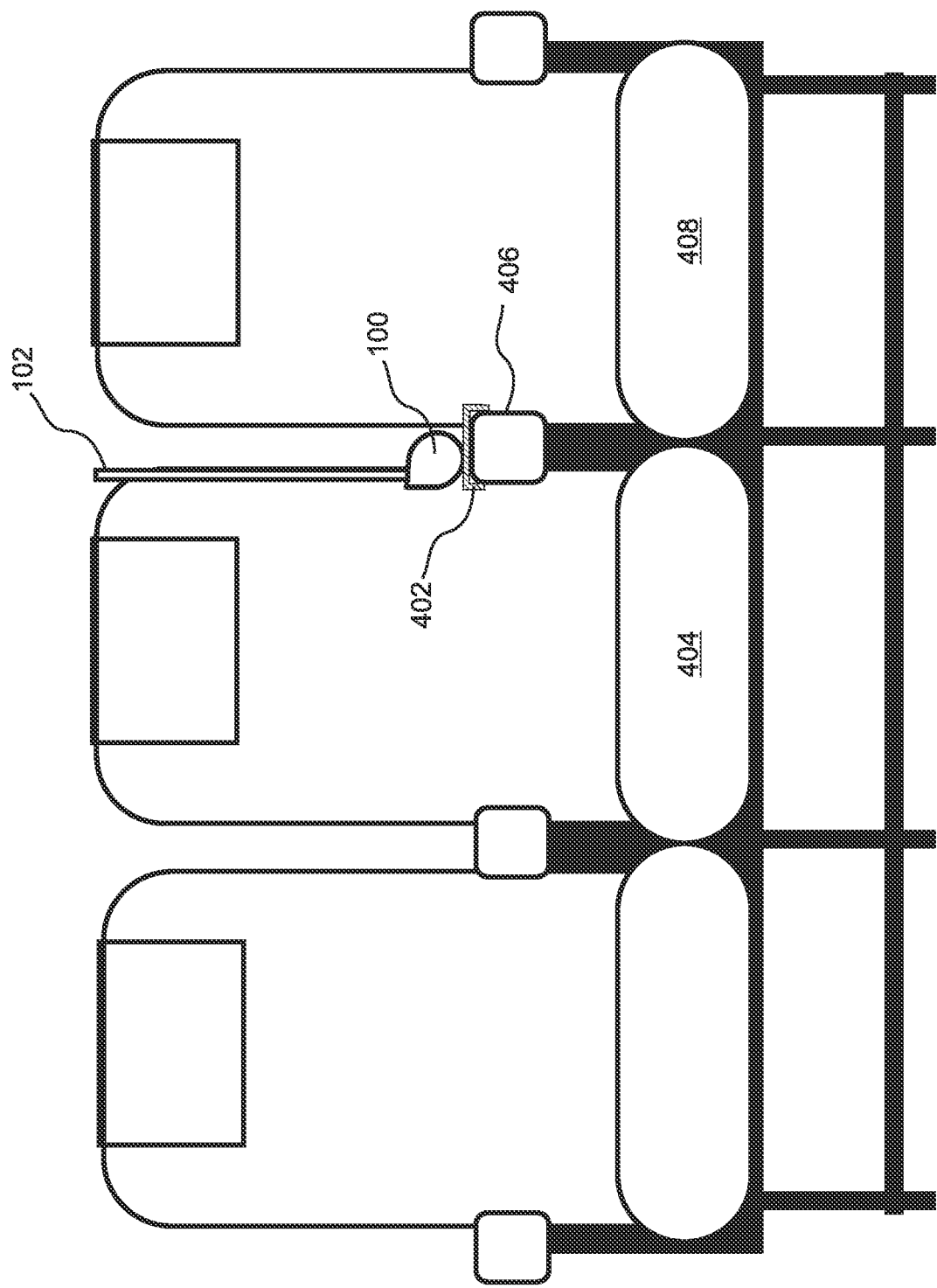
FIG. 4E is a front view of a row of airline seats showing the embodiment of FIG. 4B deployed.

With reference to FIGS. 4A through 4E, the disclosed apparatus further includes one or more attachment mechanisms 126, 400, 402 that is/are able to fix the case 100 in a position proximal to a passenger who is seated in an airline seat 404. In the embodiments of FIGS. 4A through 4E, the attachment mechanisms 126, 400, 402 are configured to position the case 100 above and proximal to an arm rest 406 that is provided between the passenger's seat 404 and an adjacent seat 408. FIG. 4A illustrates the embodiment of FIGS. 1C-1E shown with the shield 100 retracted so that only the pocket 128 extends beyond the case 100. The illustrated embodiment includes an attachment arm 126 that can be pivoted 412 about a single pivot 414 so as to align with the case when not in use. In the figure, the attachment arm 126 has been pivoted downward in preparation for attachment. FIG. 4B illustrates the embodiment of FIG. 1B, and shows the extension of a pair of attachment arms 400 downward from the case 100 about a pair of pivots 414. FIG. 4D illustrates the insertion of the attachment arm 126 or arms 400 of FIG. 4A or 4B between a seat cushion 404 and a wall 410 that is supporting the arm rest 406. In similar embodiments, for example if an arm rest 406 is not provided or is not deployed, the attachment arm 126 or arms 400 can be inserted between adjacent seat cushions 404, 408. In the embodiments of FIGS. 4C and 4E, the attachment is by a bracket 402 that is attached to the case 100 and attachable to the arm rest 406.

Figure 5:
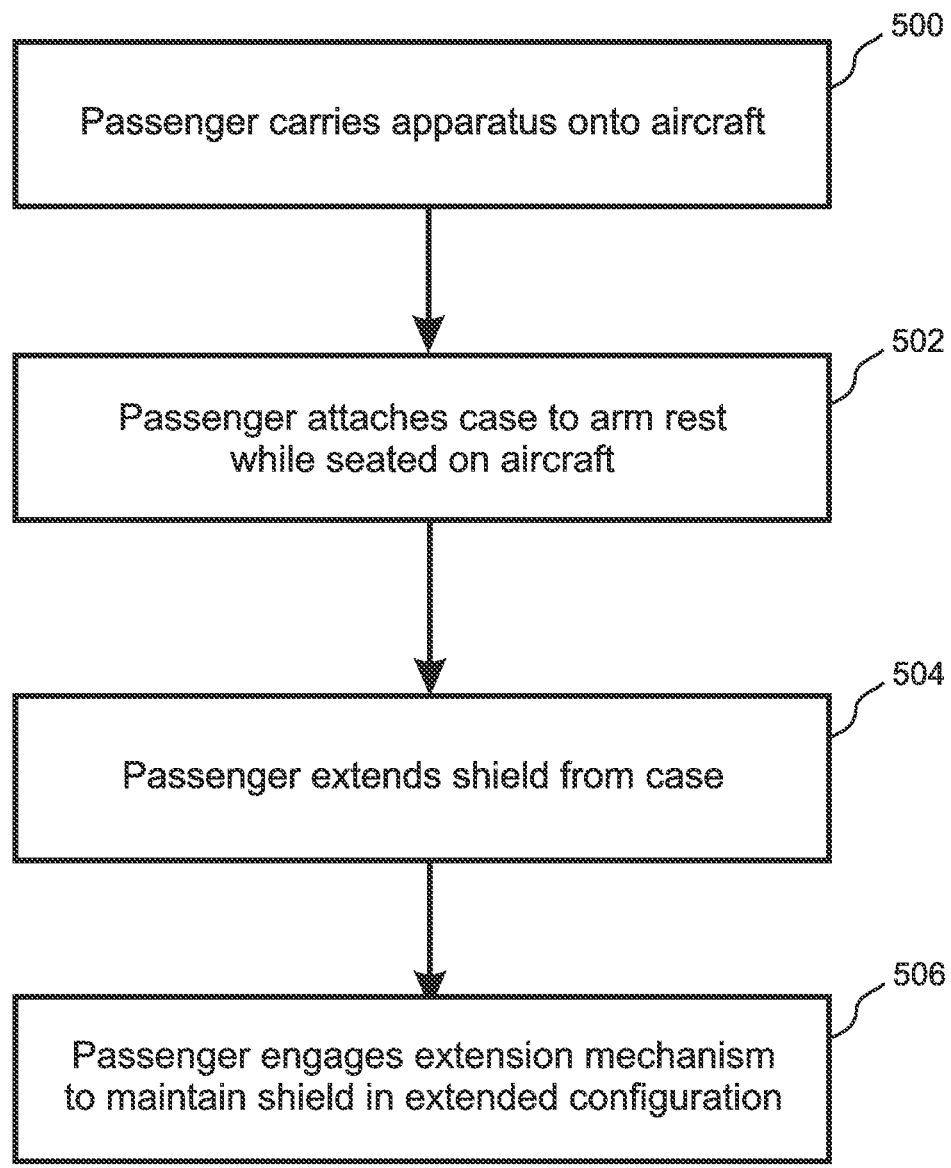
FIG. 5 is a flow diagram that illustrates a method embodiment of the present invention.

With reference to FIG. 5, according to method of use embodiments of the present invention a passenger carries the disclosed apparatus onto an aircraft 500, for example within the passenger's carry-on luggage. Once seated in an airline seat, the passenger attaches the apparatus 502 to an arm rest or similar structure located between the passenger and an adjacent passenger, or between the passenger and an aisle. The passenger then deploys the flexible shield from the case 504, and engages the extension mechanism 506 so as to maintain the flexible shield in a vertical and substantially flat configuration between the passenger and the adjacent passenger or aisle, so that the flexible shield functions as a barrier to any exchange of airborne droplets between the passenger and the adjacent passenger, or between the passenger and other persons passing by in the aisle. In embodiments where the passenger is seated in a non-window seat, the passenger can bring two of the disclosed apparatuses onto the plane, so that a shield can be deployed on each side of the passenger.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the invention is not limited to just these forms, but is amenable to various changes and modifications without departing from the spirit thereof. The disclosure presented herein does not explicitly disclose all possible combinations of features that fall within the scope of the invention. The features disclosed herein for the various embodiments can generally be interchanged and combined into any combinations that are not self-contradictory without departing from the scope of the invention. In particular, the limitations presented in dependent claims below can be combined with their corresponding independent claims in any number and in any order without departing from the scope of this disclosure, unless the dependent claims are logically incompatible with each other.

We claim:

1. An apparatus for reducing a risk of cross-contamination between adjacent first and second passengers while traveling on an aircraft, the apparatus comprising:
   a flexible shield;
   a case configured for containing the flexible shield when the flexible shield is not deployed, the flexible shield being extendable from the case;
   an attachment mechanism configured to attach the case to a structural member of the aircraft, such that the case is located beside the first passenger and between the first and second passengers, said attachment mechanism comprising at least one attachment arm that is attached to the case and configured, in preparation for deployment of the flexible shield, to be pivoted so that it extends downward and can be inserted beside a seat cushion upon which the first passenger is sitting, the attachment arm being further configured when the apparatus is not attached to the structural member of the aircraft to be pivoted so that it extends horizontally in alignment with the case; and
   an extension mechanism configured to maintain the flexible shield in a substantially flat, vertical configuration when the flexible shield is extended upward from the case, thereby providing a barrier between the first and second passengers that inhibits cross contamination between the first and second passengers by airborne droplets.

2. The apparatus of claim 1, wherein the flexible shield is configured to be coiled within the case when the flexible shield is not deployed.

3. The apparatus of claim 2, further comprising a spring configured to withdraw the flexible shield into the case when deployment of the flexible shield is terminated.

4. The apparatus of claim 3, further comprising a ratchet mechanism configured to maintain the shield exterior to the case while the shield is in use, and to release the shield for retraction by the spring into the case when use of the shield has ended.

5. The apparatus of claim 1, wherein the flexible shield comprises a sleeve, and the extension mechanism comprises a rigid or semi-rigid rod that can be inserted into the sleeve.

6. The apparatus of claim 5, wherein the apparatus further comprises a storage cavity within which the rigid or semi-rigid rod can be stored when not deployed.

7. The apparatus of claim 6, wherein the storage cavity is provided on a exterior surface of the case.

8. The apparatus of claim 6, wherein the storage cavity is provided at an upper end of the shield.

9. A method of reducing a risk of cross-contamination between first and second passengers seated in adjacent seats of an aircraft, the method comprising:
   providing an apparatus according to claim 1;
   transporting by the first passenger of the apparatus into the aircraft;
   upon being seated in the aircraft adjacent to the second passenger, attachment of the apparatus by the first passenger to a structural member of the aircraft by means of the attachment mechanism, such that the case is located beside the first passenger and between the first and second passengers, said attachment including pivoting of the at least one attachment arm so that it extends downward, and inserting of the attachment arm beside a seat cushion upon which the first passenger is sitting;
   extension by the first passenger of the flexible shield from the case vertically upward; and
   deployment by the first passenger of the extension mechanism, thereby maintaining the flexible shield in a substantially flat, vertical configuration, such that the flexible shield functions as a barrier between the first and second passengers that inhibits cross contamination between the first and second passengers by airborne droplets.

10. The method of claim 9, wherein inserting the attachment arm includes either inserting the attachment arm between the seat cushion upon which the first passenger is sitting and a wall that is supporting an arm rest between the first and second passengers or, if said wall is not present, between the seat cushion upon which the first passenger is sitting and a seat cushion upon which the second passenger is sitting.

11. The method of claim 9, wherein said at least one attachment arm comprises a first attachment arm that is permanently attached to the case proximate a proximal end of the case, and a second attachment arm that is permanently attached to the case proximate a distal end of the case.

12. The apparatus of claim 1, wherein the attachment arm is configured for insertion either between the seat cushion upon which the first passenger is sitting and a wall that is supporting an arm rest between the first and second passengers or, if said wall is not present, between the seat cushion upon which the first passenger is sitting and a seat cushion upon which the second passenger is sitting.

13. The apparatus of claim 1, wherein said at least one attachment arm comprises a first attachment arm that is permanently attached to the case proximate a proximal end of the case, and a second attachment arm that is permanently attached to the case proximate a distal end of the case.

* * * * *